THEORETICAL VIBRATION ISOLATION CURVES

INVENTORS
PATRICK M. SWEENEY
LAURENCE L. EBERHART

BY *Schmieding and Fultz*
ATTORNEYS

VIBRATION ISOLATION FOR 1-INCH THICK GLASS FIBER MATERIAL

VIBRATION ISOLATION FOR 2-INCH THICK GLASS FIBER MATERIAL

INVENTORS
LAURENCE L. EBERHART
PATRICK M. SWEENEY
BY
Schmieding and Fultz
ATTORNEYS

United States Patent Office 3,203,654
Patented Aug. 31, 1965

3,203,654
APPARATUS FOR ISOLATING VIBRATIONS
Patrick M. Sweeney and Laurence L. Eberhart, Dublin, Ohio, assignors to Consolidated Kinetics Corporation, Columbus, Ohio, a corporation of Ohio
Filed Mar. 11, 1963, Ser. No. 265,017
9 Claims. (Cl. 248—54)

This invention relates to supporting structures for isolating apparatus from environmental vibrations and for isolating vibration and shock inducing apparatus from adjacent areas.

More particularly the present invention relates to novel hangers and vertical supports for conduits or the like.

This application is a continuation in part of my copending application Serial No. 37,525 filed June 20, 1960, which is a continuation-in-part of Serial No. 818,201 filed June 4, 1959, now abandoned.

It has been discovered, in accordance with the present invention, that certain pads of glass fiber material are uniquely excellent for isolating vibrations provided the density of the material is greater than eight pounds per cubic foot, the diameters of the glass fibers are less than .00050 of an inch, and the lengths of the glass fibers are disposed transversely of the direction of load application. For example, fiber diameters between .00020 of an inch and .00024 of an inch gives excellent results in most applications. It has been found that fiber diameters greater than .00060 of an inch result in natural frequencies that are too high for achieving effective vibration isolation and, moreover, pads formed thereof are characterized by inadequate load bearing characteristics. By careful selection of glass fiber diameters, of the air space between the individual fibers, the density, and loading, glass fiber performs like a damped, non-linear spring due to the elasticity of the glass and the pumping action of the entrapped air. Compressing the glass fiber to heavy densities comparable to balsa wood or soft pine, large loads per unit area can be carried by the glass fiber and the damped non-linear spring action is retained.

It has further been discovered in accordance with the present invention that improved vibration isolation supports having a constant natural frequency under variations in the weight of the load being supported can be fabricated in accordance with the equation $$W = W_o e A (d - d_o)$$

said equation to be described in detail later herein.

There are two aspects to the problem of vibration isolation: First, the isolation of forces of the type created by rotating and reciprocating machinery, such as fans, compressors, electric motors, and diesel engines; and second, the isolation of motions such as occur in airplanes, ships, vehicles, industrial buildings, offices, and even residential buildings.

The principal objective in the first mentioned aspect is the reduction in the magnitude of the force transmitted to the support for the machinery.

In the second aspect, the principal objective is a reduction in the vibration amplitude so that the mounted equipment or occupants will be subjected to vibration of less severity than the supporting structure.

The general principle, in both cases, is to mount the equipment upon resilient supports or isolators in such a manner that the natural frequency of the equipment-and-isolator system is substantially lower than the frequency of the vibration to be isolated.

Various densities of glass fiber have a load bearing range in which deflection occurs comparable to that of a non-linear spring. As the glass fiber is compressed under load, the natural frequency of the load-and-glass fiber system becomes lower, similar to a non-linear spring. Because of the low natural frequency of the deflected glass fiber under load, its use for vibration isolators becomes apparent.

In general, the conduit mounts of the present invention include spaced load plates separated by a pad of glass fiber material.

In accordance with the present invention, the novel vibration isolation supports most effectively utilize the previously mentioned vibration isolating property of glass fiber pads for maintaining a constant natural frequency under variations in the weights of the loads being supported. Moreover, the vibration isolation supports of the present invention possess excellent internal damping characteristics whereby the supported apparatus are most effectively isolated from the environment so far as the transmission of positive and negative vibrations is concerned.

As another aspect of the present invention, the glass fiber pads are in some instances provided with flexible coverings that protect the glass fiber material from contaminants. These flexible coverings are in some instances air impervious whereby air within the interstices formed by the glass fibers is entrapped to form an air spring that modifies the main spring action of the glass fiber material. In other instances the flexible coverings are provided with orifices that make them air pervious whereby the pad assemblies function as glass fiber springs provided with shock absorber action.

It is another aspect of the present invention to provide a novel conduit support of simple construction that is particularly adapted to mount conduits to a supporting structure so as to prevent the transmission of positive or negative vibrations between the conduit and the supporting structure.

It is therefore an object of the present invention to provide novel conduit supports that include glass fiber spring systems that maintain constant natural frequency with variations in the load being supported and which possess superior internal damping characteristics whereby the supports more efficiently isolate vibration sensitive apparatus from environmental vibrations.

It is another object of the present invention to provide novel supporting structures of the type described which can be prefabricated in standardized units and hence readily installed at low cost.

It is another object of the present invention to provide novel supporting structures of the type described that provide effective reduction of vibration even at low frequencies.

It is another object of the present invention to provide novel supporting structures the dimensions of which are relatively non-critical in regard to achieving the vibration reduction.

It is another object of the present invention to provide novel supporting structures for isolating vibrations, the vibrational properties of which are relatively independent of temperature, humidity, and exposure to oil and other contaminates.

It is another object of the present invention to provide novel supporting structure of the type described that includes glass fiber pads provided with flexible coverings that form auxiliary air springs that modify the spring action of the glass fiber material.

It is another object of the present invention to provide novel supporting structure of the type described that includes glass fiber pads provided with air pervious flexible coverings that provide shock absorber action for the glass fiber material.

Further objects and advantages of the present invention will be apparent from the following description, reference being had to the accompanying drawings wherein preferred forms of embodiments of the invention are clearly shown.

In the drawings:

FIG. 4A is a side sectional view showing a modified glass fiber pad constructed in accordance with the present invention;

Figure 4:
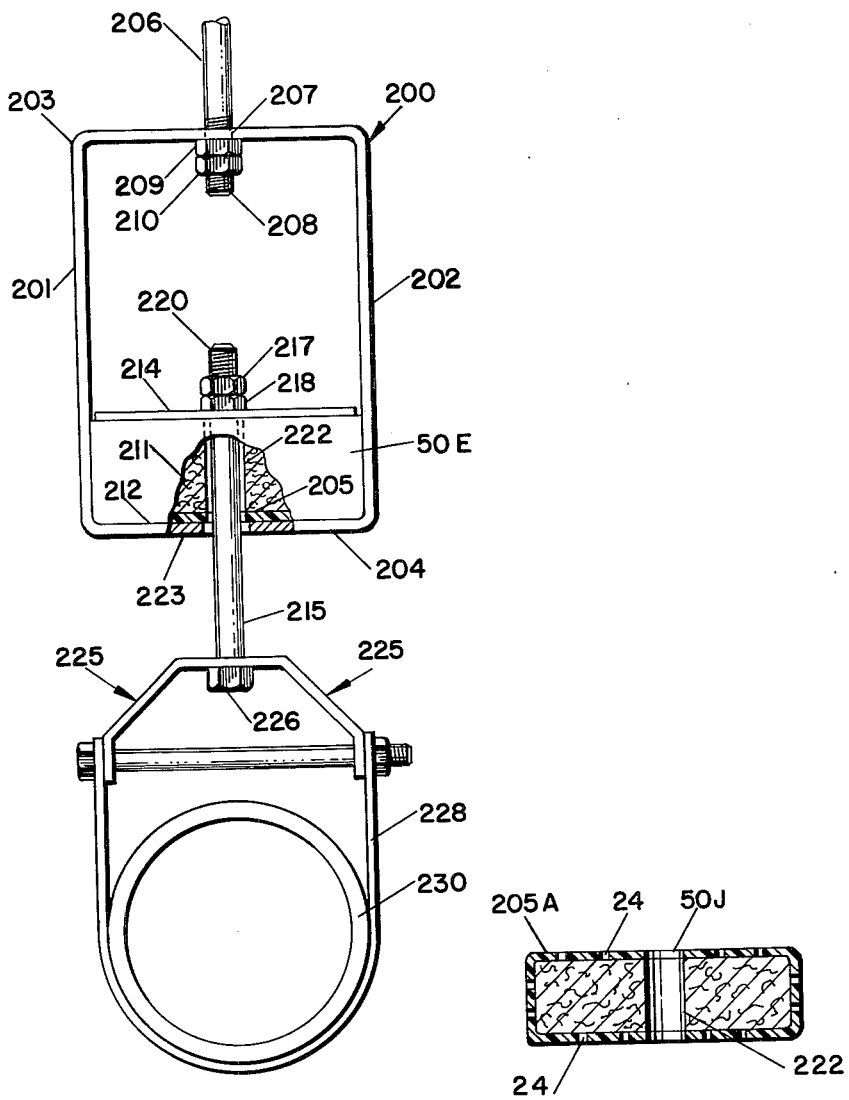
FIG. 4 is an end view, partially in section, of a conduit hanger support constructed according to the present invention.

Referring in detail to the drawings a conduit support constructed in accordance with the present invention is illustrated in FIG. 4 and includes a bracket indicated generally at 200 provided with spaced vertical side walls 201 and 202, a top wall 203, and a bottom wall 204. A rod 206 extends through a hole 207 in top wall 203 and includes a lower threaded end portion 208 which carries nuts 209 and 210. Rod 206 connects to a typical ceiling support in a building structure.

A pad 50–E of glass fiber material is supported on an upper surface 212 of lower wall 204.

The pad 50E is formed of glass fiber material provided with an impervious flexible covering 205 that impregnates only the interstices in the outer regions of the glass fiber material. The flexible covering 205 can be formed by neoprene, vinyl or other suitable flexible composition without departing from the spirit of the present invention.

In the embodiment of FIG. 4A composite pad 50J is provided with a fluid pervious flexible covering 205A that includes a plurality of interstices 24 seen in FIG. 4A. It will be understood that pad 50J differs from pad 50E in that the interstices form passages for the ingress and egress of air under the pumping action imposed on the pad when subject to vibratory loading. It should be further pointed out that the impervious coating 205 on pad 50E of FIG. 4 causes the pad to function as a mechanically damped air spring whereas the fluid pervious pad 50J of FIG. 4A provides viscous and mechanical damping.

With continued reference to FIG. 4, pad 50–E supports a load plate 214, the edges of which are spaced from vertical walls 201 and 202. A rod 215 is secured to load plate 214 by means of nuts 217 and 218 carried on upper threaded end portion 220. Rod 215 passes freely through a hole 222 in pad 50–E and also through a hole 223 formed through lower wall 204.

A conduit hanger indicated generally at 225 is suspended on a head 225 on the lower end of rod 215 and includes an inverted U-shaped portion 28 that directly supports a conduit 230.

It will be understood that a plurality of brackets 200, illustrated in FIG. 4, are utilized at spaced intervals along the conduit 230.

Figure 5:
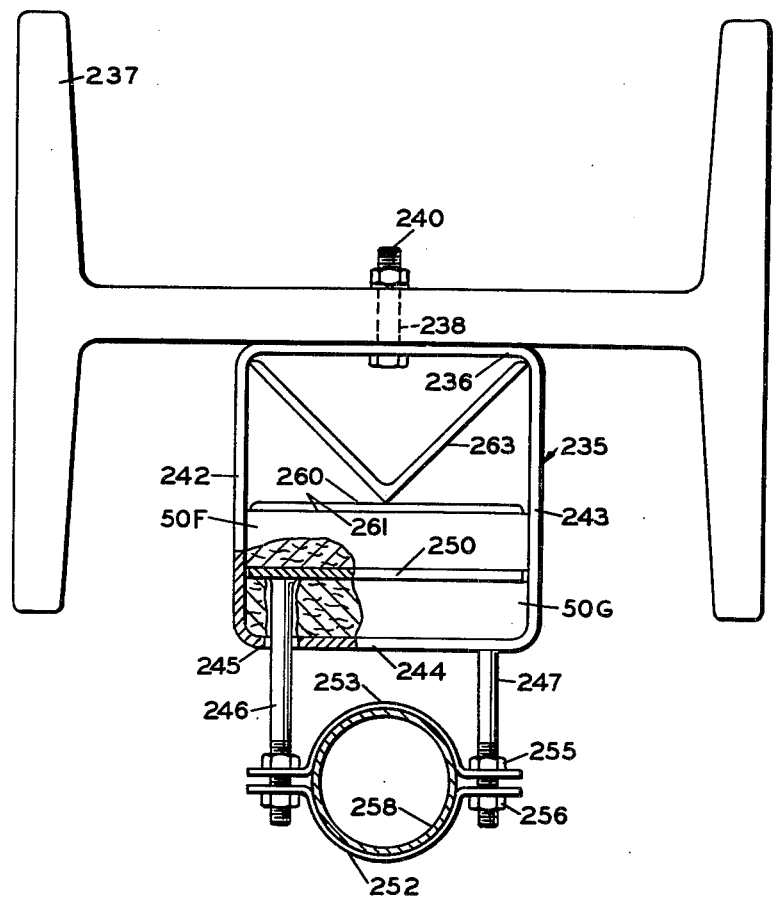
FIG. 5 is a top view, partially in section, of a vibration isolator for vertical rise conduits, said isolator being constructed according to the present invention.

Reference is next made to FIG. 5 which illustrates an isolator for vertical rise conduits, said isolator including a bracket indicated generally at 235 that includes an inner wall 236 attached to a vertical column 237 that comprises a portion of a wall structure of a building. Column 237 includes a hole 238 through which a bolt 240 is extended for attaching bracket 235 to vertical column 237.

Bracket 235 includes spaced side walls 242 and 243 and an outer end wall 244, the latter being provided with holes 245 through which are extended rods 246 and 247.

The inner ends of rods 246 and 247 are attached to a load plate 250 which plate is sandwiched between pads of glass fiber material indicated at 50–F and 50–G.

If desired the pads 50–F and 50–G can be provided with air impervious coverings such as the covering 205 in FIG. 4 or air pervious coverings such as the covering 205–A of FIG. 4A.

The outer ends of rods 246 and 247 carry a tubing clamp including arcuate portions 252 and 253 clamped together by nuts 255 and 256. A conduit 258 is disposed in clamped relationship between arcuate portions 252 and 253.

A plate 260 engages an upper surface 261 of a pad 50–F and a V-shaped member 263 is wedged between inner end wall 236 and plate 260 to preload pads 50–F and 50–G to cause said pads to assume a predetermined optimum natural frequency.

The figure of merit for a vibration isolator is its transmissibility, the ratio of the transmitted vibratory force to the driving or forcing vibratory force, $$\text{transmissibility} = \frac{\text{transmitted force}}{\text{driving force}}$$

In order to make this small, it is necessary that the isolator have a natural or resonant frequency considerably lower than the frequency of the driving force. The resonant frequency is the number of cycles or vibrations per second at which an object on a resilient support will vibrate when it is pushed down and released suddenly. The frequency of the driving force is the number of force alternations per second. Thus, a shaft with a simple unbalance rotating at 1200 r.p.m. has a principal driving frequency of 1200/60 or 20 cycles per second (c.p.s.). Usually, the driving force has components having several frequencies, but these can be considered separately with more attention to the lower frequencies where it is more difficult to isolate vibration.

Figure 1:
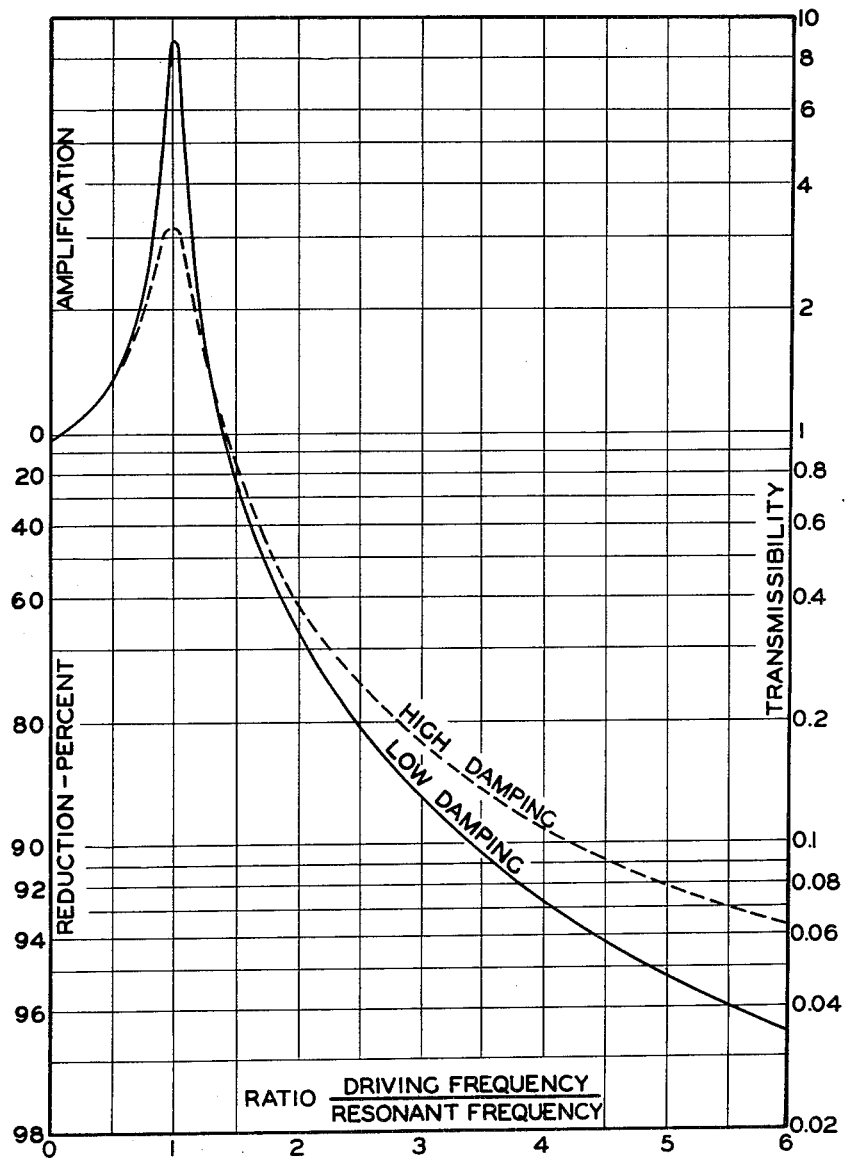
FIG. 1 is a graph illustrating theoretical vibration isolation curves.

The way in which the transmissibility depends on the resonant and driving frequencies is shown in FIG. 1. It is seen that (1) the mounting is effective only for frequency ratios greater than 1.4 (below this, there is amplification of the driving force) and (2) for a given driving frequency, the lower the resonant frequency can be made, the lower the transmissibility will be.

A low resonant frequency is obtained if the stiffness of the isolater is small and the supported weight is large. This combination, however, means a soft support and a large deflection under a static load which may be objectionable because of stability, belt pull, etc. A compromise is often called for and a ratio of frequencies between about 2.5:1 to 4:1 can usually be tolerated. This gives a transmissibility between 0.2 and 0.1, or a reduction of the vibrating force between 80 and 90 percent.

Another factor affecting transmissibility is damping or energy absorption which brings vibrating systems more or less quickly to rest after the driving force has been removed. For example, an automobile has springs to provide a low frequency suspension and has shock absorbers which abstract energy and quickly bring the system to rest after going over a bump. Referring again to FIG. 1, two curves are shown, one for low damping and the other for high damping. Some damping is advantageous near the peak of the curve where the exciting force goes through the resonance region, as in a machine coming up to speed, since this reduces extreme amplitudes, but damping in the operating frequency (speed) region detracts from the vibration isolation effect. This harmful effect is ordinarily not great and, furthermore, the damping is advantageous at higher frequencies involved in noise and shock where the simple theory does not hold.

It is pointed out that no vibration isolation mounting will be as effective as rated if the mounted machinery rests on a resonant or thin support of floor. Thus, machinery on a wooden floor or thin wall will be difficult to isolate.

There are other requirements for a practical vibration isolator aside from its performance in vibration. It must be able to withstand any thrusts necessary for the operation of the machine and must have a long life in spite of mechanical fatigue, corrosion, oxidation, contamination with dirt, oil, moisture, etc. and temperature variations. Glass fiber padding, when not overloaded, is a satisfactory material since it is rather inert chemically and is negligibly affected by the usual contaminants and temperatures.

In designing a vibration isolator, use has often been made in vibration manuals of curves of deflection under the gravity load of the machine plotted against the resonant frequency. The ratio of this frequency to the driving frequency has then been used to find the transmissibility. Except for special cases, including steel helical springs, this procedure gives lower transmissibility than is actually present. Most non-metallic materials such as rubber, plastics, and fibrous materials deflect slowly under load and also recover slowly. This non-linear action results in a dynamic stiffness for vibration which is two to four times the static stiffness under steady load. Information on transmissibility for the above materials must therefore be obtained from measurements under dynamic or vibratory test conditions.

Unlike rubber, the ratio of thickness to free surface in glass pads is unimportant and a pad of large area will behave the same when it is cut up into a number of small pads of the same thickness.

Figure 2:
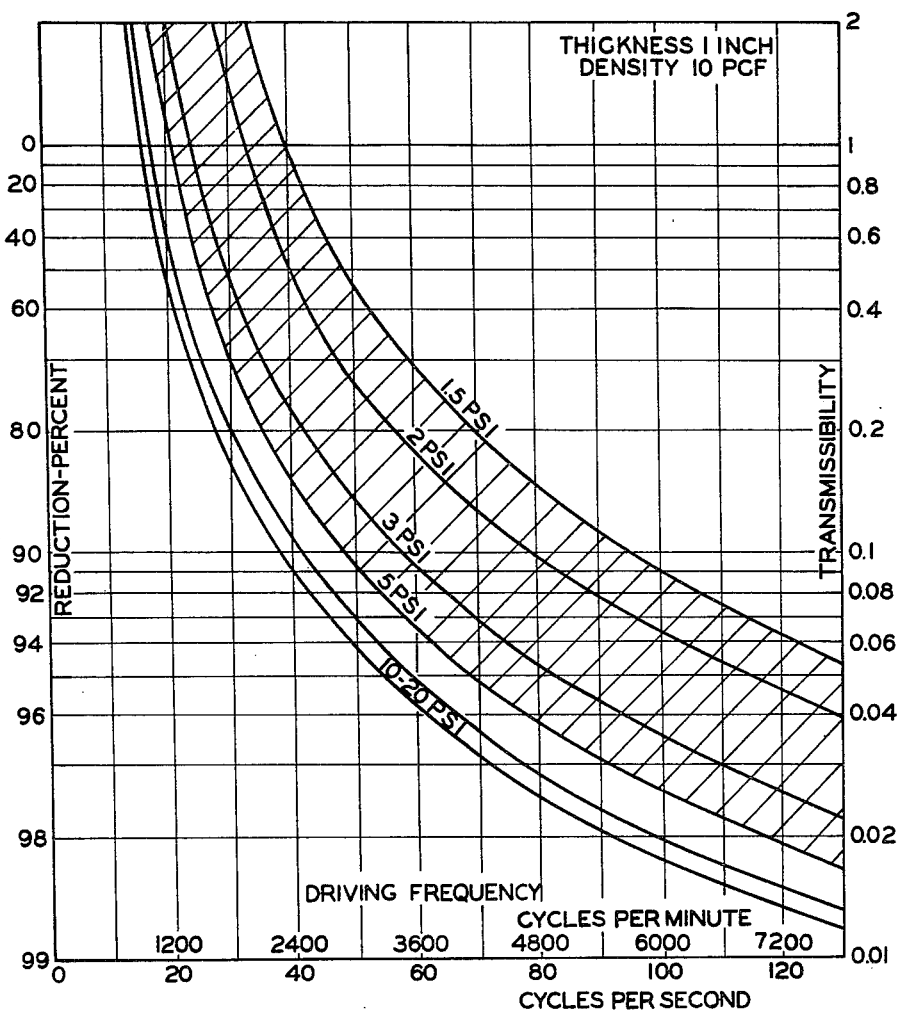
FIG. 2 is a graph showing the vibration isolation characteristics of one-inch thick glass fiber material.

Vibratory tests on glass fiber materials have been made over a considerable range of loads. The results, shown in FIG. 2, are typical for a specific density and can be used as a basis for the design of vibration isolators. Knowing the frequency of the driving force (horizontal scale), the transmissibility or vibration reduction (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Knowing the frequency of the driving force (horizontal scale), the desired transmissibility (vertical scale) can be found for various loads and thicknesses. One of the advantages of glass fiber material is that its vibration reduction is not as dependent on exact loading as the reduction for many other materials. This is because glass fiber material becomes stiffer as the load is increased and its effective resonant frequency changes less with load than the resonant frequency of many other materials. The charts show design characteristics for thicknesses of 1 and 2 inches. The reduction for other thicknesses can be found by using FIG. 2 for 1-inch and multiplying the actual driving frequency by the square root of the thickness.

Life tests under combined static and vibration loading have shown that glass fiber materials will stand up in general use at static load deflections of about 50 percent.

Figure 3:
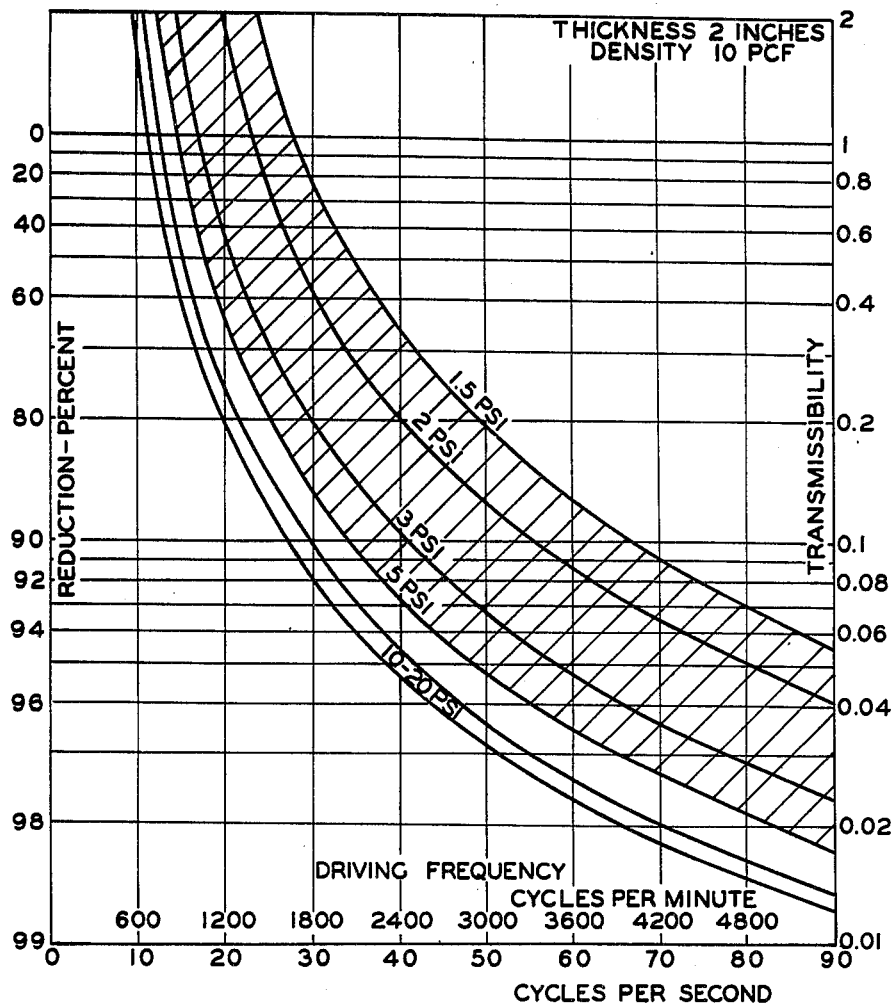
FIG. 3 is a graph showing the vibration isolation characteristics of two-inch thick glass fiber material.

As an example in using the charts, assume that it is desired to reduce the vibration of a machine by 90 percent (to ten percent of the vibration force with no isolation). The machine weighs 100 pounds and has a driving frequency of 30 c.p.s. (a rotational speed of 1800 r.p.m.) with a simple unbalance load. On the design charts, the intersection of a horizontal line at 90 percent reduction with a vertical line at 30 c.p.s. driving frequency gives the static load. In FIG. 2, this point falls below the curves, which means that 90 percent reduction cannot be obtained for thickness of 1 inch or less. In FIG. 3, however, the point for 90 percent reduction at 30 c.p.s. falls just above the curves for a static pressure load of 10 to 20 p.s.i. The total area of isolating pads will be the total weight divided by the static pressure load, 50 to 100 square inches, and four pads about 4 x 4 inches should be satisfactory.

In operation, the supporting structure is designed in accordance with the graphs 7 and 8, or similar graphs for various other densities, taking into account the particular load to be supported and driving frequency to be encountered.

Figure 6:
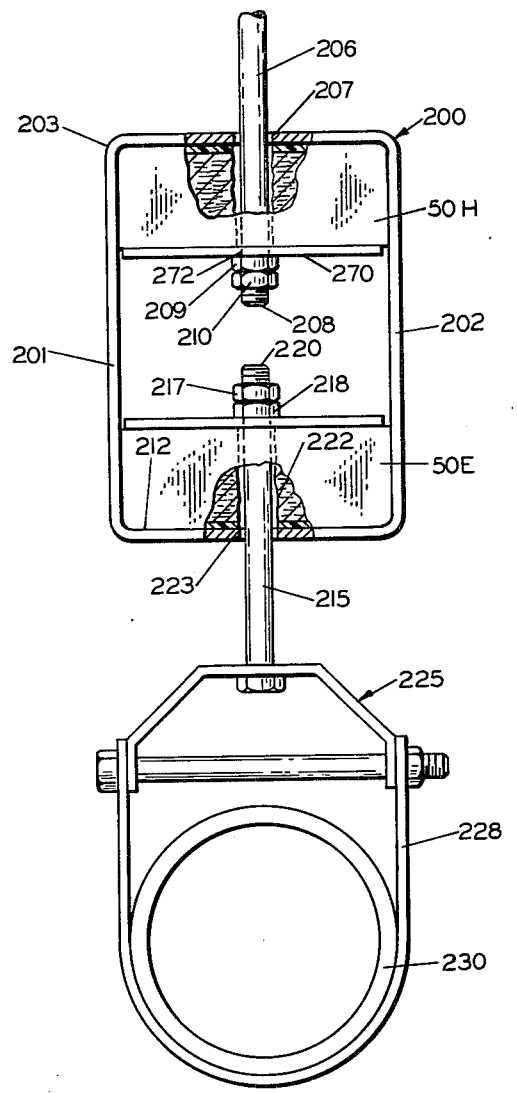
FIG. 6 is an end view partially in section of a second conduit hanger support constructed according to the present invention and comprising a modification thereof.

Reference is next made to FIG. 6 which illustrates a modified pipe hanger constructed in accordance with the present invention. This modification is similar to that of FIG. 4 and corresponding elements have been designated by identical numerals. The modification of FIG. 6 differs, however, from that of FIG. 4 in that it includes a second pad of glass fiber material indicated at 50–H and a second load plate 270. Load plate 270 includes a hole 272 through which the threaded end 208 of rod 206 is extended.

It will be noted that the flexible pads 50–E and 50–H are shown provided with air impervious flexible coverings 205 which function as auxiliary air springs. If desired the modified flexible coverings 205–A of FIG. 4A can be used to provide shock absorber action.

It will be understood that with the embodiment of FIG. 6 double isolation is achieved since lower pad 50–E isolates lower rod 215 from bracket 200 and upper rod 206 is isolated from bracket 200 by upper pad 50–H.

In accordance with the present invention it has been discovered that pads of glass fiber material of the type described herein have a unique characteristic that makes them particularly suitable for vibration isolation. This characteristic is the maintenance of constant natural frequency independent of the weight supported by the isolator. The advantage of this useful characteristic is only achieved if the pad of glass fiber material is properly loaded for any given natural frequency and for any given density of the glass fiber isolator.

Figure 7:
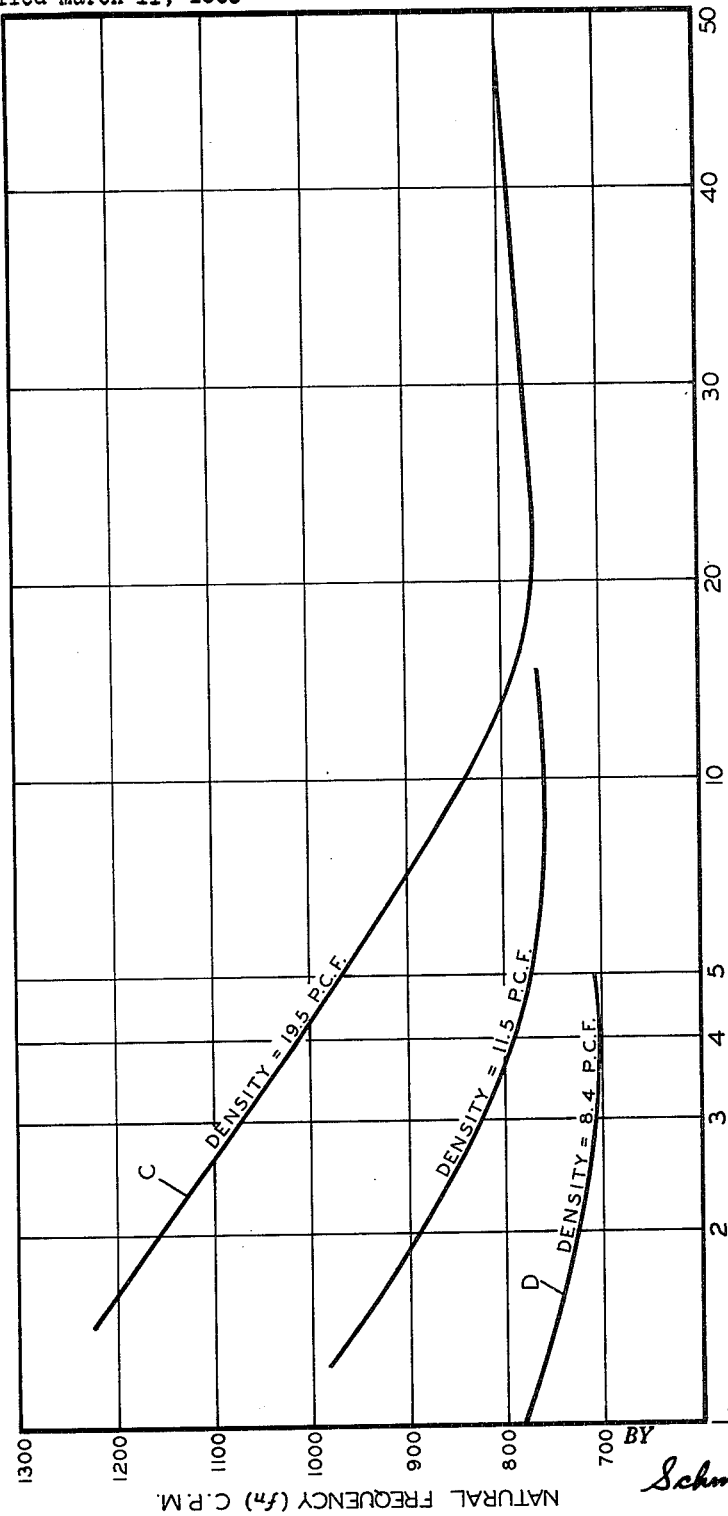
FIG. 7 is a graph showing the relationship between natural frequencies and variations in loads being supported by vibration isolation supports constructed in accordance with the present invention.

FIG. 7 is a graph showing the variations of natural frequency $f_n$ with respect to variations in the load W supported by the isolator for various densities of glass fiber materials ranging between 8.4 and 19.5 pounds per cubic foot.

This unique characteristic of maintaining constant natural frequency can be defined mathematically since the glass fiber pads behave as isolators having a non-linear force-deflection curve. The right side of the below listed equation reduces to a constant, and the natural frequency becomes independent of the weight supported by the isolator.

(1) $$f_n = 3.13 \sqrt{\frac{k_v}{W}}$$

Substituting $k_v = dW$ in Equation 1 (the force F is equal to the supported weight W) and rearranging terms:

(2) $$\frac{4\pi^2 f_n^2}{g} d\delta = \frac{dW}{W}$$

An expression for the force-deflection curve is obtained from the integration of Equation 2. A family of curves results from this process, depending on the constant of integration. A particular curve is specified by selecting a point with the coordinates $W_o$, $\delta_o$ such that all points of the curve whose coordinates are numerically greater than $W_o$, $\delta_o$ will represent conditions of constant natural frequency. Integrating Equation 2:

(3) $$\frac{4\pi^2 f_n^2}{g} \delta \int_{\delta_o}^{\delta_o} \log W \int_{W_o}^{W}$$

Equation 3 may be writen exponentially as follows:

(4) $$W = W_o e^{A(\delta - \delta_o)}$$

An isolator whose force-deflection curve conforms to Equation 4 thus exhibits a constant natural ferquency $f_n$ when supporting any load greater than $W_o$.

With reference to FIG. 7 the natural frequency of curve C (17.2 pounds per cubic foot density) remains substantially constant at 780 cycles per minute when the weight of the mounted body W is greater than $W_o$, with $W_o$ being equal to approximately 17 pounds as seen from the abscissa of the graph of FIG. 7 when the weight W of the mounted body is less than $W_o$ (10 pounds), the natural frequency shows the inverse tendency which is characteristic of linear isolators.

With continued reference to FIG. 7 the characteristic of a lower density isolator is illustrated by curve D. Curve D represents a density of the glass fiber material of 8.4 pounds per cubic foot. Here $W_o$ occurs approximately at 3¾ pounds load. Above this loading natural frequency remains substantially constant with variations in load and below this loading the natural frequency shows the inverse tendency which is characteristic of linear isolators.

In the formulas previously discussed herein the following symbols are defined as follows:

$W$=actual load applied to isolator
$W_o$=load above which natural frequency is independent of variations in load W
$\delta$=deflection of isolator under load W
$\delta_o$=deflection of isolator under load $W_o$
$f_n$=natural frequency
$ky$=stiffness of isolator
$e$=the basis for the Napierian system of logarithms
$g$=gravitational constant
$\pi$=3.1416

$$A = \frac{4\pi^2 f_n^2}{g}$$

While the forms of embodiments of the present invention as herein disclosed constitute preferred forms, it is to be understood that other forms might be adopted, all coming within the scope of the claims which follow:

We claim:

1. A structure for mounting a conduit and isolating vibrations, said structure comprising, in combination, bracket means including a first rigid wall provided with an opening and forming a first inwardly facing surface and a second rigid wall forming a second inwardly facing surface; a plurality of pads of glass fiber material disposed between said first and second inwardly facing surfaces each of said pads including a flexible covering to form composite pads that function as modified air springs, said pads of glass fiber material having a density greater than eight pounds per cubic foot, said fibers extending transversely of the direction of load application, the diameters of said fibers being less than .0005 of an inch; a rigid load plate disposed between certain of said plurality of pads and spaced from said bracket means; and a conduit supporting member extended through said opening and certain of said pads and including an inner end attached to said load plate and an outer end for attachment to said conduit.

2. A structure for mounting a conduit and isolating vibrations, said structure comprising, in combination, bracket means including a first rigid wall provided with an opening and forming a first inwardly facing surface and a second rigid wall forming a second inwardly facing surface; a plurality of pads of glass fiber material disposed between said first and second inwardly facing surface each of said pads including a flexible covering to form composite pads that function as modified air springs, said pads of glass fiber material having a density greater than eight pounds per cubic foot, said fibers extending transversely of the direction of load application, the diameters of said fibers being less than .0005 of an inch, said bracket means including means for applying preloaded compression to said pads to cause said pads to assume a predetermined optimum natural frequency; a rigid load plate disposed between certain of said plurality of pads and spaced from said bracket means; and a conduit supporting member extended through said opening and certain of said pads and including an inner end attached to said load plate and an outer end for attachment to said conduit.

3. A structure for mounting a conduit and isolating vibrations, said structure comprising, in combination, bracket means including a first wall for attachment to a building wall structure, second and third walls extending outwardly from said first wall in spaced relationship, and a fourth wall including an opening and forming a first inwardly facing surface; a plate forming a second inwardly facing surface; a plurality of pads of glass fiber material disposed between said first and second inwardly facing surfaces said pad including a flexible covering to form a composite pad that functions as a modified air spring; a spacer member wedged between said first wall and said plate for subjecting said pads to preloaded compression; a rigid load plate disposed between certain of said plurality of pads and spaced from said bracket means; and a conduit supporting member extended through said opening and certain of said pads and including an inner end attached to said load plate and an outer end for attachment to said conduit.

4. A vibration isolation conduit support system having a substantially constant natural frequency under variations in the weight of a supported load, said system comprising, in combination, a bracket member including a rigid wall provided with an opening and forming an inwardly facing surface; means for attaching said bracket member to a building structure: a pad of glass fiber material having a density greater than eight pounds per cubic foot, said fibers extending transversely of the direction of load application, the diameters of said fibers being less than .0005 of an inch, said pad having a force-deflection curve conforming to the equation $$W = W_o e^{A(\delta - \delta_o)}$$

said pad including a flexible covering to form a composite pad that functions as a modified air spring; a rigid load plate supported by said pad and spaced from said bracket member; a rod member extending through said pad and said opening and including an inner end attached to said load plate and an outer end; and a load attached to said outer end of said rod member, said load, rod member, and load plate having a weight W substantially equal to or greater than $W_o$, the symbols in said equation being defined as follows:

$W$=actual load applied to isolator
$W_o$=load above which natural frequency is independent of variations in load W
$\delta$=deflection of isolator under load W
$\delta_o$=deflection of isolator under load $W_o$
$f_n$=natural frequency
$e$=the basis for the Napierian system of logarithms
$g$=gravitational constant
$\pi$=3.1416

$$A = \frac{4\pi^2 f_n^2}{g}$$

5. A mounting means for horizontally suspending a conduit and isolating vibrations, said mounting means comprising, in combination, a bracket member including a rigid bottom wall forming an upwardly facing surface a rigid top wall forming a downwardly facing suface, a first side wall connecting said top and bottom walls, and a second side wall connecting said top and bottom walls, certain of said top and bottom walls including an opening; a pad of glass fiber material on certain of said surfaces; a flexible covering for said pad of glass fiber material forming a composite pad construction that functions as a modified air spring; a rigid load plate engaging said pad and spaced from said bracket member; a rod member extending vertically through said pad and said opening and including an inner end attached to said load plate and an outer end provided with an attaching means.

6. A vibration isolation conduit load support system having a substantially constant natural frequency under variations in the weight of a supported load, said system comprising, in combination, a bracket member including a rigid bottom wall forming an upwardly facing surface; a pad of glass fiber material on said upwardly facing surface having a density greater than eight pounds per cubic foot, said fibers extending transversely of the direction of load application, the diameters of said fibers being less than .0005 of an inch, said pad having a force-deflection curve conforming to the equation $$W = W_o e^{A(\delta - \delta_o)}$$

a flexible covering for said pad of glass fiber material forming a composite pad construction that functions as a modified air spring; a rigid load plate supported by said pad and spaced from said bracket member; a rod member extending vertically through said pad and said opening and including an upper end attached to said load plate and a lower end; and a load attached to said lower end of said rod member, said load, rod member, and load plate having a weight W substantially equal to or greater than $W_o$, the symbols in said equation being defined as follows:

$W$ = actual load applied to isolator
$W_o$ = load above which natural frequency is independent of variations in load W
$\delta$ = deflection of isolator under load W
$\delta_o$ = deflection of isolator under load $W_o$
$f_n$ = natural frequency
$e$ = the basis of the Napierian system of logarithms
$g$ = gravitational constant
$\pi$ = 3.1416

$$A = \frac{4\pi^2 f_n^2}{g}$$

7. A mounting means for supporting a load and isolating vibrations, said mounting means comprising, in combination, a bracket member including spaced side walls, a bottom wall forming an upwardly facing surface, and a top wall forming a downwardly facing surface; a pad of glass fiber material supported by said upwardly facing surface said pad including a flexible covering to form a composite pad that functions as a modified air spring; a rigid load plate supported by said pad and spaced from said bracket member; a first rod member including an upper end attached to said load plate and a lower end; means for attaching a load to said lower end of said rod member; a second rigid load plate spaced from said bracket member; a second pad of glass fiber material disposed in load supporting relationship between said second load plate and said downwardly facing surface said pad including a flexible covering to form a composite pad that functions as a modified air spring; a second rod member including a lower end attached to said second load plate and an upper end for attachment to a building structure, each of said glass fiber pads having a density greater than eight pounds per cubic foot, said fibers extending transversely of the direction of load application, the diameters of said fibers being less than .0005 of an inch, said pad having a force-deflection curve conforming to the equation $$W = W_o e^{A(\delta - \delta_o)}$$

and a load attached to said outer end of said first rod member, said load, rod member, and load plate having a weight W substantially equal to or greater than $W_o$, the symbols in said equation being defined as follows:

$W$ = actual load applied to isolator
$W_o$ = load above which natural frequency is independent of variations in load W
$\delta$ = deflection of isolator under load W
$\delta_o$ = deflection of isolator under load $W_o$
$f_n$ = natural frequency
$e$ = the basis of the Napierian system of logarithms
$g$ = gravitational constant
$\pi$ = 3.1416

$$A = \frac{4\pi^2 f_n^2}{g}$$

8. A vibration isolation load support system having a substantially constant natural frequency under variations in the weight of a supported load, said system comprising, in combination, a bracket member including an upper wall forming a downwardly facing surface and including an opening, a lower wall forming an upwardly facing surface, and spaced side walls connecting said upper and lower walls; an upper isolator on said downwardly facing surface; a lower isolator on said upwardly facing surface; a lower isolator on said upwardly facing surface, certain of said isolators consisting of a pad of glass fiber material having a density greater than eight pounds per cubic foot, said fibers extending transversely of the direction of load application, the diameters of said fibers being less than .0005 of an inch, said pad having a force-deflection curve conforming to the equation $$W = W_o e^{A(\delta - \delta_o)}$$

said pad including a flexible covering to form a composite pad that functions as a modified air spring; a first rigid load plate in load supporting engagement with one of said isolators; a second rigid load plate in load supporting engagement with the other of said isolators; a first rod member including a first end attached to one of said load plates and a second end for attachment to a building structure; a second rod member including a first end attached to the other of said load plates and a second end; and a load attached to said second end of said rod member, said load, rod member, and load plate having a weight W substantially equal to or greater than $W_o$, the symbols in said equation being defined as follows:

$W$ = actual load applied to isolator
$W_o$ = load above which natural frequency is independent of variations in load W
$\delta$ = deflection of isolator under load W
$\delta_o$ = deflection of isolator under load $W_o$
$f_n$ = natural frequency
$e$ = the basis of the Napierian system of logarithms
$g$ = gravitational constant
$\pi$ = 3.1416

$$A = \frac{4\pi^2 f_n^2}{g}$$

9. A mounting means for supporting a load and isolating vibrations, said mounting means comprising, in combination, a bracket member including an upper wall forming a downwardly facing surface and including an opening, a lower wall forming an upwardly facing surface, and spaced side walls connecting said upper and lower walls; an upper isolator on said downwardly facing surface; a lower isolator on said upwardly facing surface; certain of said isolators consisting of a pad of glass fiber material; a rigid load plate in load supporting engagement with one of said isolators; a first rod member including an inner end attached to said load plate and an outer end said pad including a flexible covering to form a composite pad that functions as a modified air spring; means for attaching a load to said outer end of said rod member; a second rigid load plate in load supporting engagement with the other of said isolators; a second rod member including an inner end attached to said second load plate and an outer end for attachment to a building structure, said glass fiber pad having a density greater than eight pounds per cubic foot, said fibers extending transversely of the direction of load application, the diameters of said fibers being less than .0005 of an inch, said pad having a force-deflection curve conforming to the equation $$W = W_o e^{A(\delta - \delta_o)}$$

and a load attached to said outer end of said first rod member, said load first rod member, and load plate having a weight W substantially equal to or greater than $W_o$, the symbols in said equation being defined as follows:

$W$ = actual load applied to isolator
$W_o$ = load above which natural frequency is independent of variations in load W
$\delta$ = deflection of isolator under load W
$\delta_o$ = deflection of isolator under load $W_o$
$f_n$ = natural frequency
$e$ = the basis of the Napierian system of logarithms
$g$ = gravitational constant
$\pi$ = 3.1416

$$A = \frac{4\pi^2 f_n^2}{g}$$

References Cited by the Examiner
UNITED STATES PATENTS

| | | | |
|---|---|---|---|
| 2,389,562 | 11/45 | Storch | 248—358 |
| 2,593,502 | 4/52 | Thomson | 248—54 |
| 2,714,497 | 8/55 | Denis | 248—62 |
| 2,766,163 | 10/56 | Schwartz | 249—24 X |
| 2,769,741 | 11/56 | Schwartz | 267—1 X |
| 2,936,142 | 5/60 | Sherburne | 248—54 |
| 3,018,991 | 1/62 | Slayter | 248—22 |

FOREIGN PATENTS 836,211   4/52   Germany.

CLAUDE A. LE ROY, *Primary Examiner.*